Aug. 21, 1956 S. J. GARTNER 2,759,499
AUTOMATIC GRID MACHINE
Filed Sept. 3, 1947 7 Sheets-Sheet 6
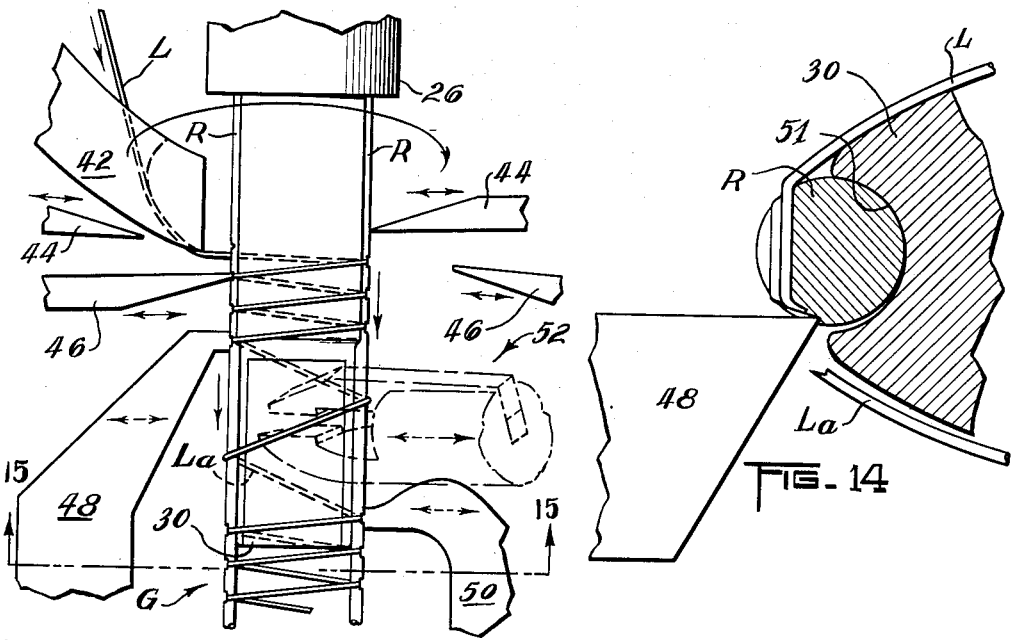
FIG. 13
FIG. 14
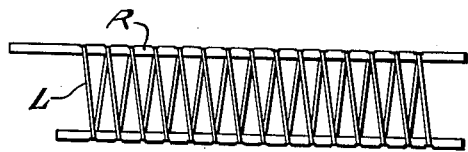
FIG. 16
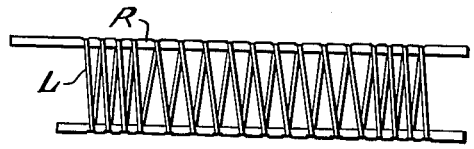
FIG. 17
FIG. 15
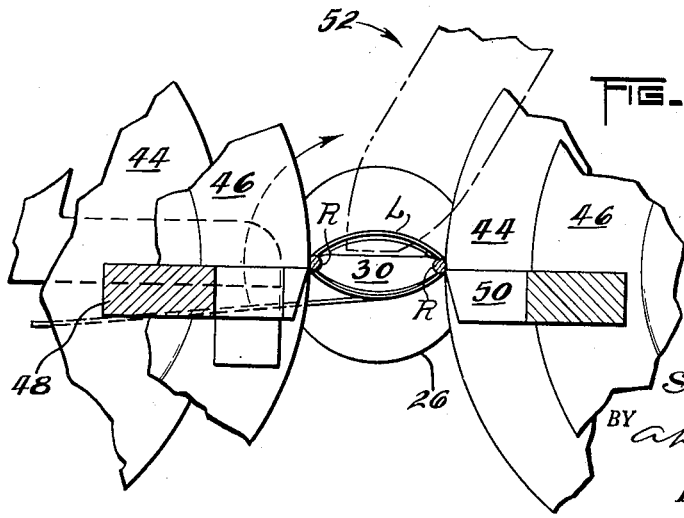
INVENTOR.
Stanley J. Gartner
BY
His Attorney Aug. 21, 1956

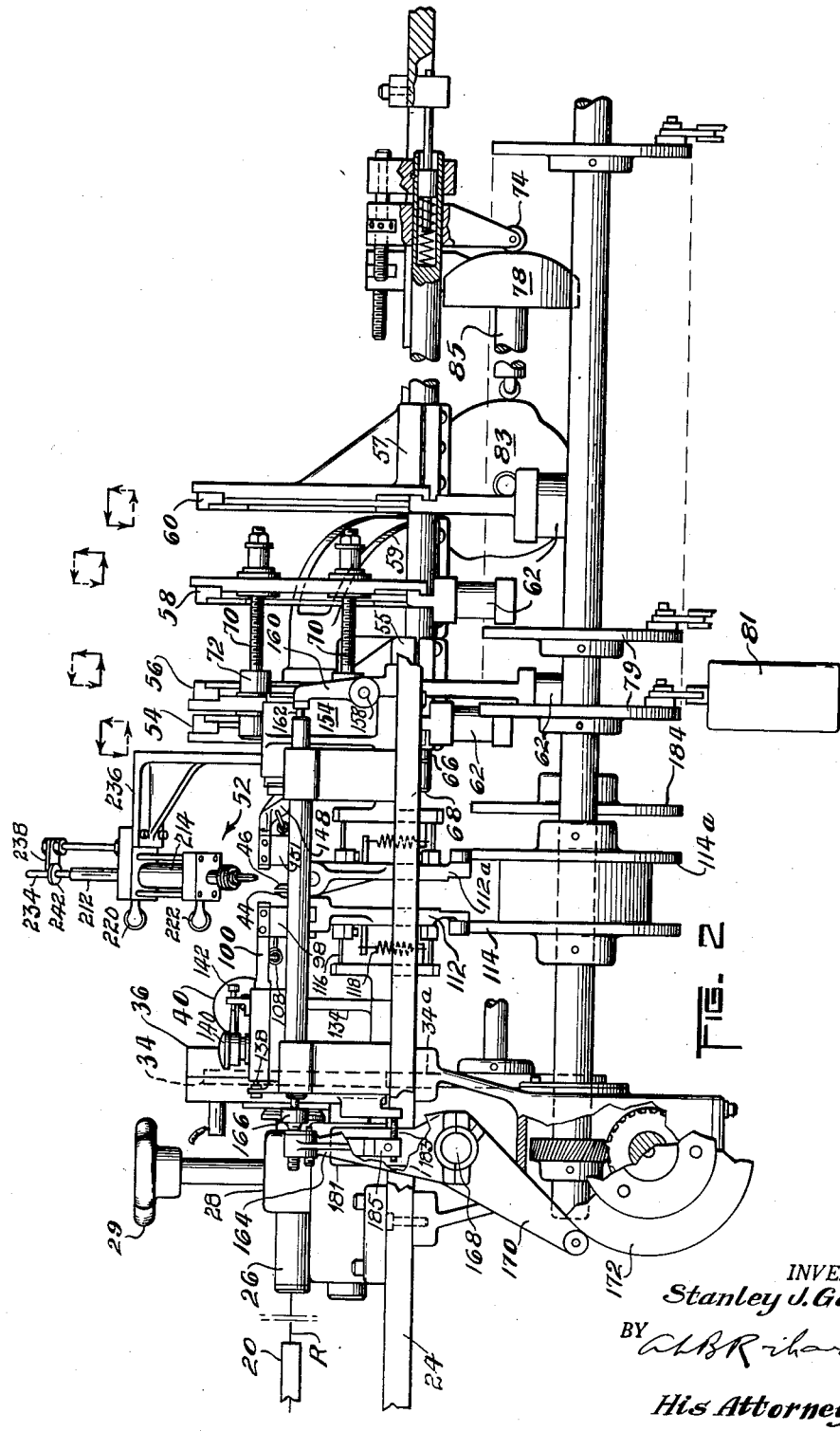

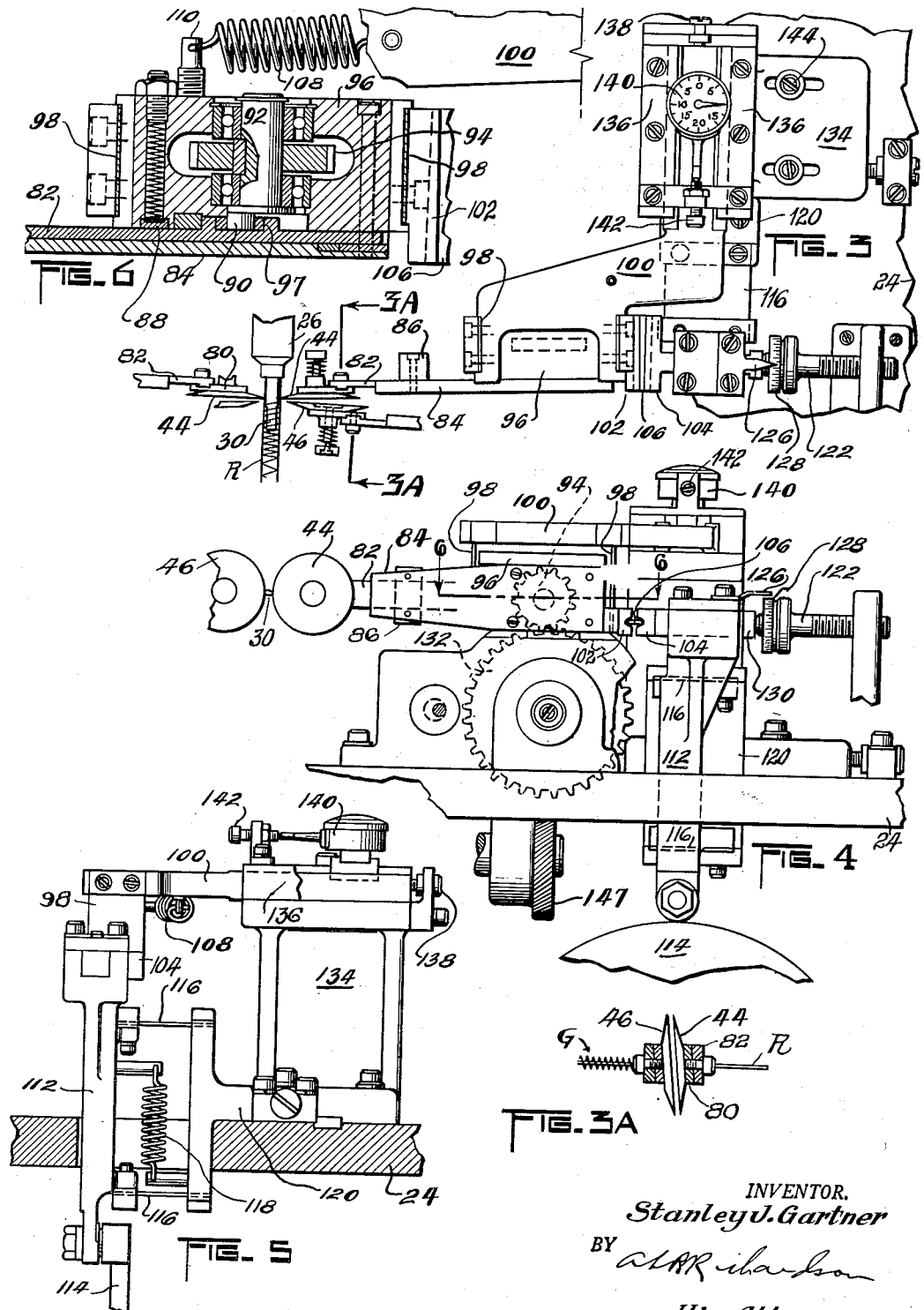

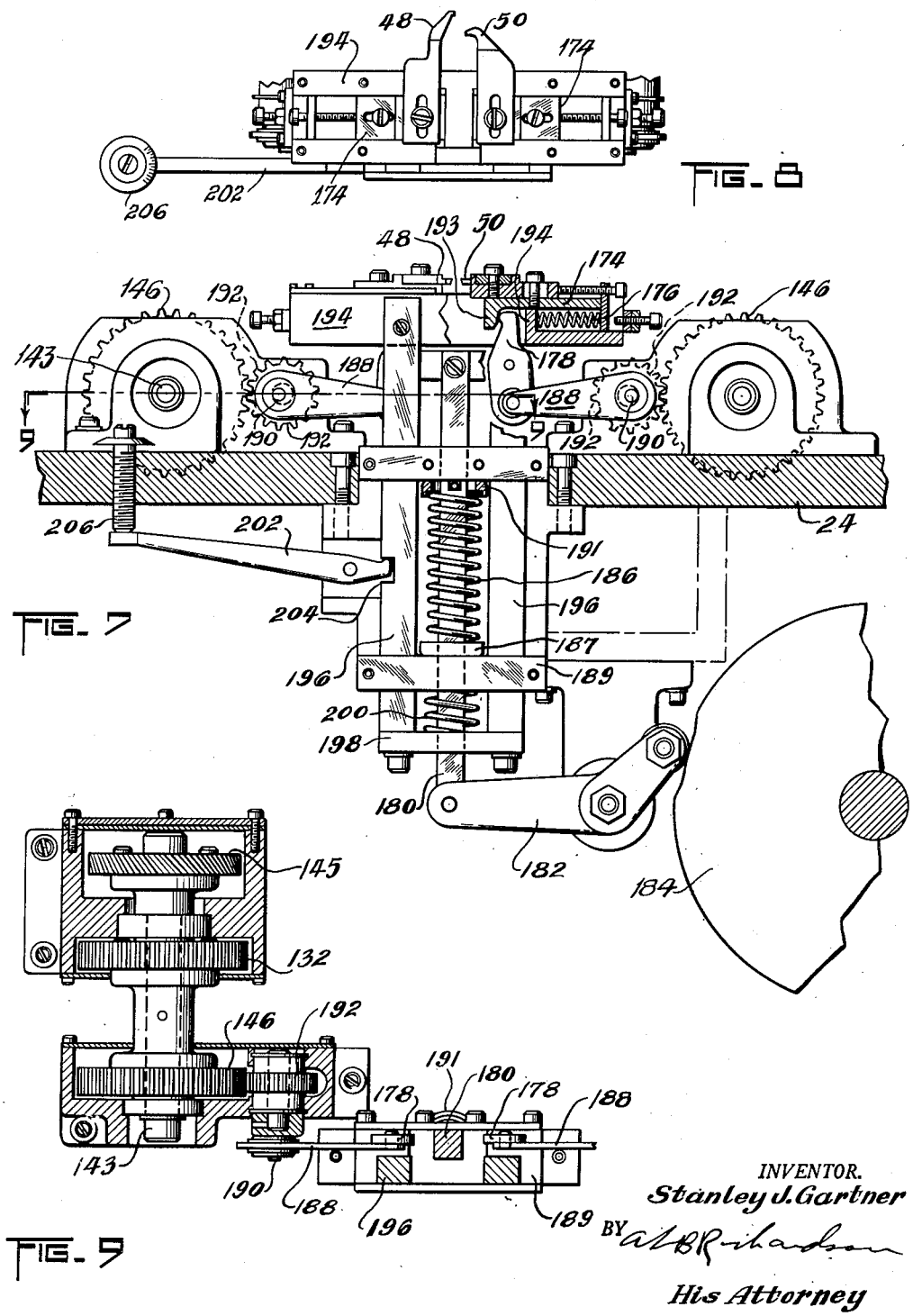

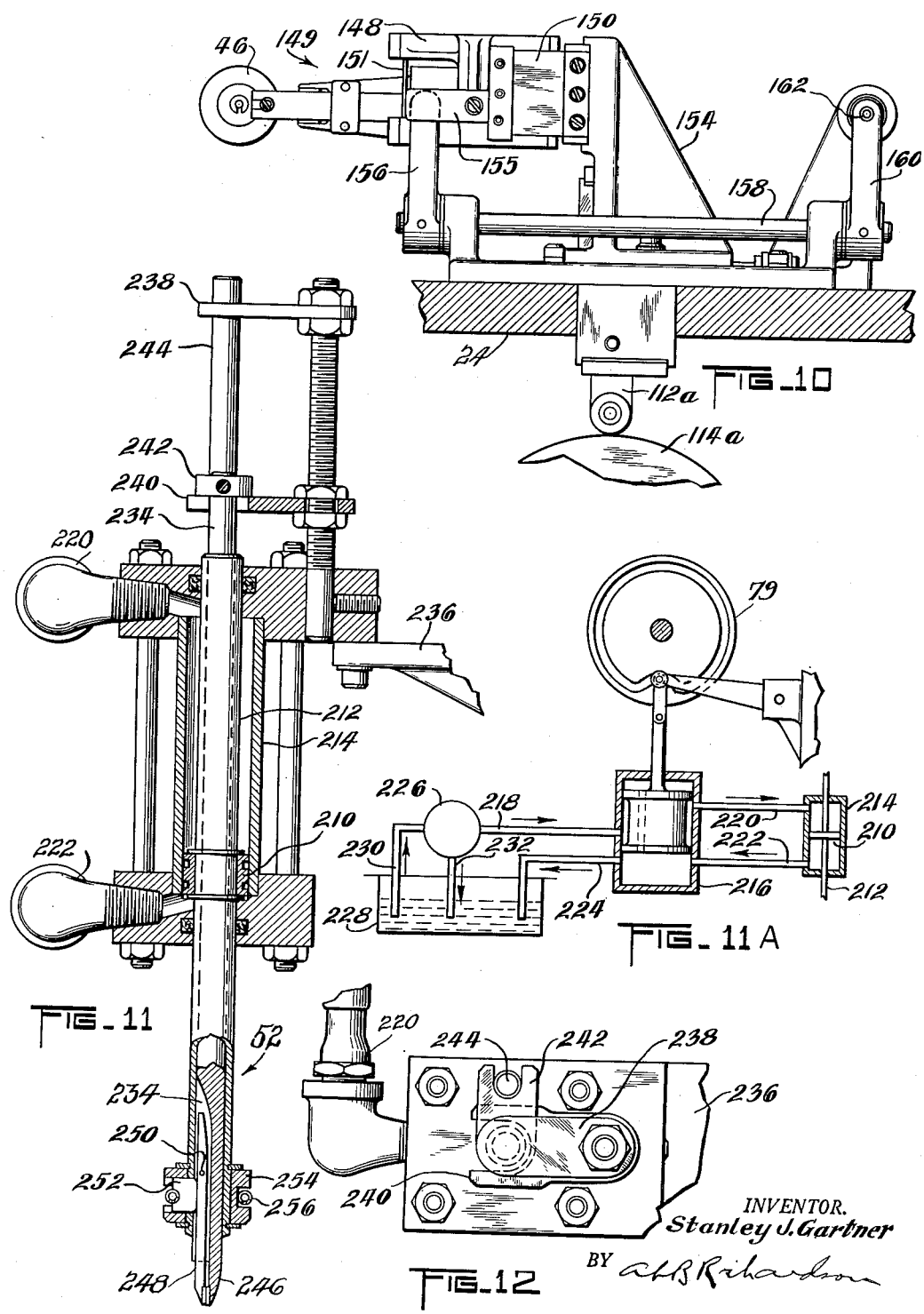

S. J. GARTNER 2,759,499

AUTOMATIC GRID MACHINE

Filed Sept. 3, 1947

INVENTOR.
Stanley J. Gartner
BY
His Attorney

United States Patent Office 2,759,499
Patented Aug. 21, 1956

2,759,499

AUTOMATIC GRID MACHINE

Stanley J. Gartner, Emporium, Pa., assignor to Sylvania Electric Products, Inc., a corporation of Massachusetts Application September 3, 1947, Serial No. 771,995

27 Claims. (Cl. 140—71.5)

The present invention is concerned with machines for making grids for electron discharge devices and the like. Grids of the type here involved include one or more parallel supporting rods and a relatively large number of closely spaced helical laterals of fine wire secured to the side rod or rods. Each side rod of a grid extends a short distance beyond the fine grid laterals to provide for its accurate orientation in an electron discharge device and also to provide for electrical connection.

Machines for making grids of this type customarily make a series of notches in the side rods, lay the turns of a helix of fine wire successively into the notches and peen the side-rod metal over each notch to secure the grid laterals successively in place. The turns may be evenly spaced for use as screen grids, suppressor grids, or sharp-cutoff control grids; or they may be of variable pitch as for control grids in variable-gain amplifier tubes. Principally because of the numerous exacting physical requirements of the grids, no fully automatic and continuously operating grid-making machine of this type has heretofore been available. Comparable grids formed by prior art machines are often delivered in strips of perhaps twelve grids each, the operation of those machines being discontinued upon completion of each strip. The side rods of each strip of grids are stretched, either in the grid-forming machine or after removal, and the strip is then divided into individual grids. The helical grid laterals are wound continuously, but are not secured to the side rods in the spaces between the individual grids comprising the strip. These unnecessary turns are painstakingly manually removed after optionally being electrically burned free. This intermittent manufacture of a series of grids in strip form for later finishing involves manual operations which not merely retard production, but also involve handling that tends to deform them.

Accordingly it is a principal object of my invention to provide a novel grid-making machine having improved features so that grids for electron discharge devices may be quickly and accurately manufactured. Although it will be apparent as the description proceeds that various features of my grid machine may be employed according to my invention without certain of the other features, such features when integrated into a single machine contribute mutually to produce a continuous automatic and accurate grid-making machine.

It is desirable in a continuous automatic machine that there be an arrangement for reliably and accurately removing the unwanted turns of grid-lateral wire between the individual grids. Incomplete removal of such loose or unwanted turns, either with detached lateral wire waste or with projecting ends of lateral wire, means defective grid production. According to one feature of my machine the separation and removal of the unwanted wire are achieved immediately in the vicinity of the winding mandrel. With this arrangement a high degree of accuracy in loose-turn removal can be achieved, and precise grids even of very small dimensions can be manufactured in a practical manner. A further feature is the parting of unwanted turns of lateral wire from the secured turns by mechanically cutting, breaking, or otherwise rupturing the grid laterals. The arrangement utilizes the side rods of the grid to provide thrust reaction for the rupturing tool.

Another feature of the improved grid machine, which is especially directed to the production of variable-pitch helical grids, is the cyclic adjustment of the spacing between the notching and peening tools to accord with the variable speed-of-side-rod-feed characteristics of variable-pitch helical grid machines. A further feature, corollary to this, is the cyclic adjustment of the wire-laying guide so that the grid wire is accurately laid in the previously formed notch in the manufacture of variable-pitch grids.

An additional feature is in the improved precision of operation and quieting of the notching and peening tools for more satisfactory operation of the grid machine and for improved manufacture of even fine-pitch grids, arising out of novel tool suspensions and operating mechanisms.

A further feature is the provision of an automatic stop in a machine of the type having longitudinally fed grid side rods and a winding head for helically laying the grid laterals in the notches previously formed, so that the machine will not continue idle and wasteful operation when the fine grid-lateral or a side rod has broken or become exhausted, and the orderly collection of the finished grids will be reliable.

The invention will be better understood from the following detailed specification and from the drawings. The features of novelty broadly outlined above and their mutual effects will be better understood, together with additional features of novelty, from this specific disclosure and from the appended claims. In the drawings, which illustrate the presently preferred but illustrative embodiment:

Fig. 2 is a lateral elevation of the entire machine with certain parts broken away and shown in section.

Figs. 3 and 4 are a plan view and an elevation, respectively, of one of the notching mechanisms.

Fig. 3A is a fragmentary sectional view along the line 3A—3A of Fig. 3.

Fig. 5 is an end view of the notching mechanism and its suspension, looking toward the left in Fig. 4.

Fig. 6 is a fragmentary sectional view along the line 6—6 in Fig. 4 showing the high-speed reciprocating drive for a notching tool.

Fig. 7 is an elevation, partly in section, of the loose-turn cutting mechanism and Fig. 8 is a partial plan view thereof.

Fig. 9 is a fragmentary sectional view along the line 9—9 in Fig. 7, showing the relation between the drive gears for the notching, peening, and the loose-turn removing mechanisms.

Fig. 10 is an elevation of the peening tool and its variable-pitch cyclic adjustment mechanism.

Fig. 11 is a sectional elevation of the loose-turn picker and Fig. 12 is a plan view thereof.

Fig. 11A is a diagrammatic view of the picker-operating mechanism.

Fig. 13 is an enlarged fragmentary view of the notching, peening and loose-turn parting tools in relation to the winding guide, the winding mandrel and (in broken lines) the loose-turn remover that is effective immediately after parting of the loose turns as shown.

Fig. 14 is an enlarged fragmentary sectional view showing the preferred manner of operation of a loose-turn parting blade.

Fig. 15 is an enlarged sectional view along the lines 15—15 in Fig. 13, illustrating the cooperation of the various tools.

Figs. 16 and 17 are greatly enlarged lateral views of grids of uniform pitch and of variable pitch, respectively.

Figure 1:
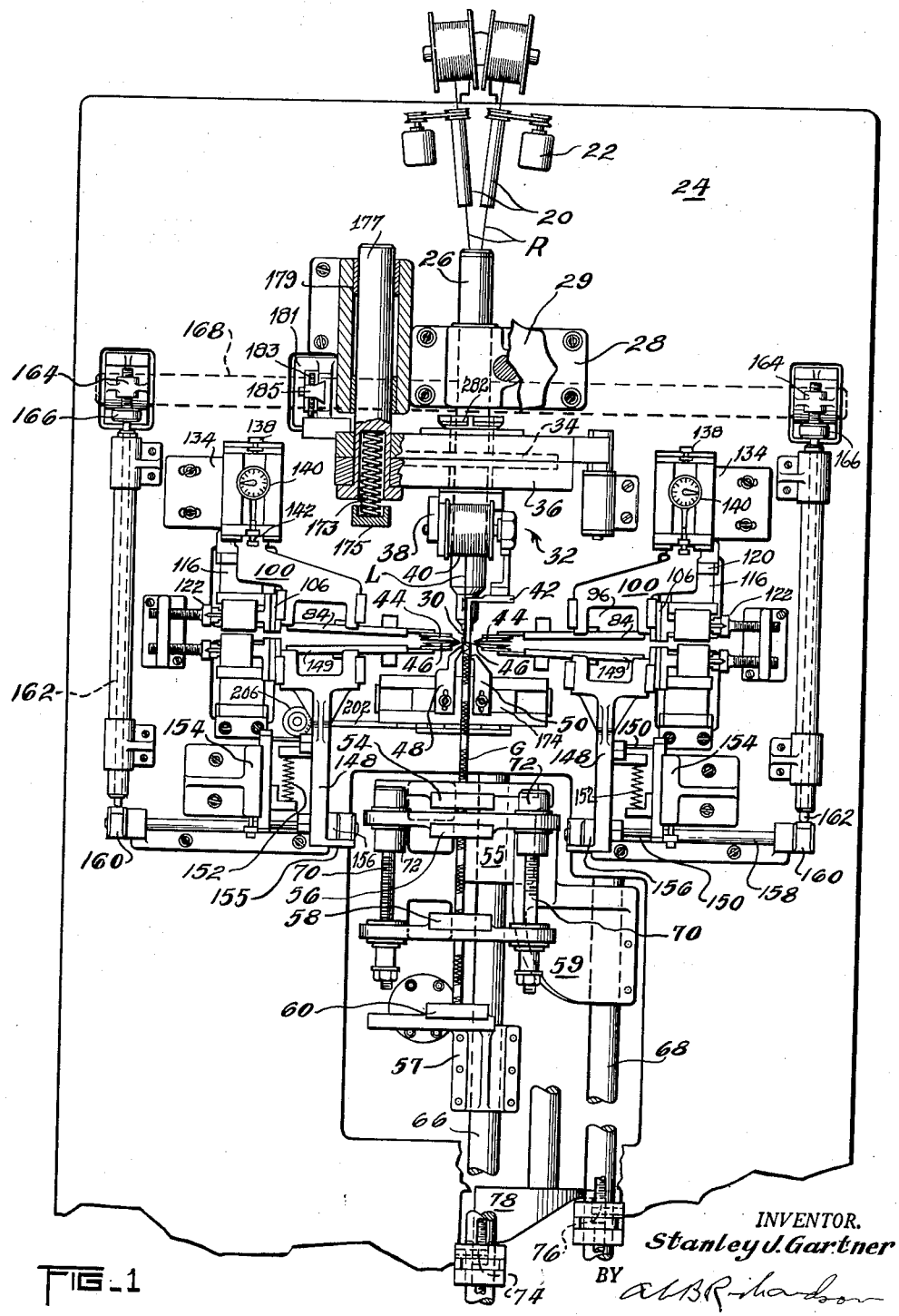
Fig. 1 is a plan view of the entire machine with certain parts shown partially in section, the loose-turn remover being omitted for clarity.
Figure 18:
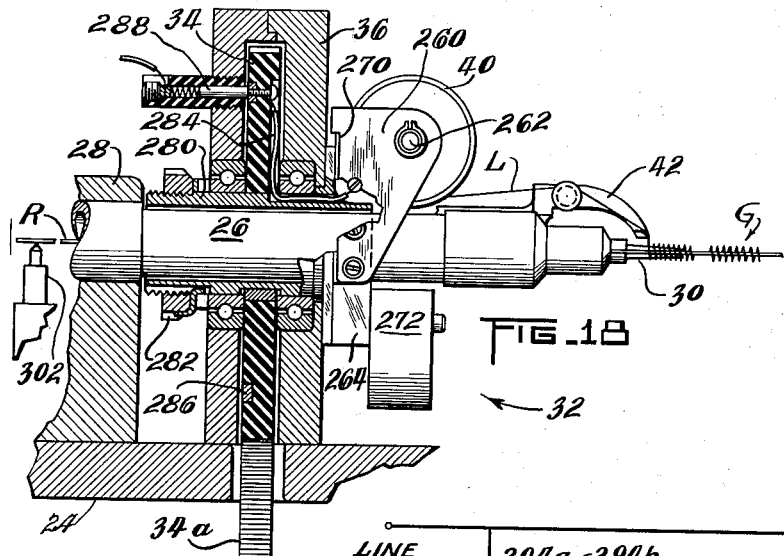
Fig. 18 is an elevation, partially in longitudinal section, of the grid lateral winding head, side-rod guide and winding mandrel.

Referring first to Figs. 1 and 2, the machine will be generally considered, after which there will be a discussion of the detailed construction of the various specific mechanisms.

Relatively heavy side-rod wires R from reels are drawn (downward in Fig. 1) through wire straighteners 20 of known construction which are belted to motors 22. These parts, which specifically form no part of the present invention, are suitably supported on bed plate 24 of the machine.

The side rods R are then guided down a dual tube 26 which is fixed to base 24 by split clamp 28. Handwheel 29 is provided to tighten the split clamp, thereby to permit axial adjustment of side-rod guide 26. Stationary winding mandrel 30 is supported at the forward end of guide 26. Between clamp 28 and mandrel 30 there is a winding head indicated generally by an arrow and numeral 32, which includes constantly driven gear 34 contained in casing 36 that is axially adjustable along guide 26. Rotatable with gear 34 is a frame 38 for rotatably and frictionally supporting a reel 40 of grid-lateral wire L. A lateral-wire guide 42 is carried by frame 38 for accurately leading the lateral wire to winding mandrel 30. The details and further features of the winding head are discussed more specifically in connection with the figures particularly related thereto.

A pair of sharp-edged discs 44 are arranged to reciprocate in alternation at opposite sides of mandrel 30 for notching side rods R, and a pair of blunt-edged discs 46 are similarly arranged for peening the side-rod material over the grid-lateral wire as it is laid in successive notches previously made by discs 44.

Fig. 13 illustrates the sequence of operations of the tools so far enumerated. As grid-lateral rods R are drawn along mandrel 30 (by mechanism to be described) discs 44 alternately notch the respective side rods. Immediately after one of the discs 44 has withdrawn guide 42 lays the lateral wire into the notch thus formed, and the opposite notching disc 44 engages its rod R in the meantime. At this time, one of the peening discs 46, adjacent the retracted disc 44, is driven against a rod to peen-over the side-rod material and thereby secure the grid-lateral in place. The stroke of disc 44 is long enough to notch a side rod and then withdraw to provide clearance for grid-lateral guide 42 on winding head 32.

Each tool 44 operates very close to one of the tools 46. Between the time that disc 44 makes its notch and the time that the adjacent disc 46 peens the lateral wire laid into the notch just formed, the grid side rod advances one pitch length, and discs 44 and 46 are separated by approximately that distance as clearly shown in Fig. 13 of the drawings. The tools 44, 46 of each pair are separated by one pitch length, while the pairs at opposite sides of the mandrel 30 are staggered relative to each other by one-half pitch length, as illustrated in Fig. 13. This has been made possible for even fine-pitch grids by supporting the notching and peening tools for alternate reciprocation along lines convergent toward mandrel 30. It has been found possible to wind grid laterals with a pitch of 70 turns to the inch using notching and peening discs made of 1/16 inch stock, with those tools mounted on slides convergent toward the mandrel between one and two degrees.

Referring again to Fig. 1, it will be seen that the material emerging from mandrel 30 is in the form of a continuous strip G of grid stock which comprises continuous side rods R and a helically wound grid lateral L, spaced by gaps where only the side-rods are to found. This spacing is to provide the terminals (see Figs. 16 and 17) for the individual grids and a waste zone (later cut away) that is deformed by the side-rod feeding mechanism. In this region it is desired that there be no grid laterals. With this purpose in view the operation of the notching and peening tools is interrupted for the short stretches between the helically wound grids which are laid into notches and secured in place, and a series of loose turns is formed by the winding head. Continuity of the grid-lateral wire is a practical requirement of a continuously operating machine, making it expedient to wind loose turns. The satisfactory removal of the loose turns thus produced has heretofore been a very serious problem.

My improved loose-turn removal arrangement includes a pair of loose-turn parting blades 48, 50, shown in close association with the devices for forming the grid. In the machine illustrated (see also Figs. 13 and 14), blades 48 and 50 are located at opposite sides of mandrel 30. The blades are made short enough in axial length so that they will sever only the ends of the loose-turn winding.

In Fig. 14, the parting of a loose turn from a secured turn is shown on a greatly enlarged scale. Mandrel 30, in which groove 51 is formed for receiving and guiding the side rods, is shown with loose-turn blade 48 in operative position. The last secured turn of grid lateral L is shown severed or broken or otherwise ruptured from the grid-lateral wire La forming the loose turns. Loose-turn blade 48 is shown adjusted below the center but not offside of the side rod, and raises that side rod against the side of the side rod, and raises that side rod against the upper portion of groove 51. The blade penetrates side rod R to some extent and buries the initially peened-over end of grid lateral L into rod R. In this way the possibility of defective grids due to free ends of grid-lateral wire is eliminated. It is desirable that the breach in the grid lateral be made well below center to retain the maximum effective length of peening. Were the cutter closer to center, the last desired turn might not be quite so effectively peened in place, and the turn which was intended to be loose might be partly anchored.

While blades 48 and 50 are shown cooperating with only the end of the grid lateral wire forming loose turn La, and that arrangement is presently preferred, the invention comprehends more broadly the removal of loose turns not only by parting the ends from the secured grid laterals, but also dividing all of the loose turns into halves, as by extending the effective lengths of blades 48 and 50 over the entire zone between the peened grid laterals. I therefore find it desirable to provide for severance or rupture of mechanical parting of the loose turns in the region of the mandrel where they are actually wound and fixed in place. That arrangement promotes high precision that is especially important in making small grids of very close pitch. I also provide for the rupture of the loose turns in a continuous helical-grid forming machine by coaction of a sharp blade with a single side-rod. This blade can optionally be extended in length for the full zone of the loose turns, and the loose turns or half-turns thus separated (by one or two blades) can be readily removed as by an air jet directed horizontally across the mandrel.

In the arrangement shown, the loose turns are separated from the grid in a superior fashion, without requiring different blades for different grids, and with less mechanical load and strain on the machine. Blades 48 and 50 are made about one pitch in length to breach only the ends of the loose turn winding (1½, 2½ or 3½ turns, etc., where blades 48 and 50 are on opposite sides of the mandrel). The winding of loose turns, thus parted from the peened turns is removed by a mechanical picker 52 shown in Figs. 2, 13 and 15 later to be described, leaving stripped side rods between the peened grid-laterals. The removal of the loose turns avoids damaging accumulation of grid-lateral scraps in the machine.

Referring to Figs. 1 and 2, four heads, 54, 56, 58 and 60 are shown which do not specifically form a part of the present invention but will be described generally. A detailed disclosure of them will be found in a joint application of which I am co-inventor and which is filed concurrently with the present application. Each of the four heads comprises a pair of jaws which are operated through a four-motion cycle. They are operated vertically by hydraulic pistons in cylinders 62 through a stroke determined by internal stops. Heads 54 and 60 are both secured by respective brackets 55 and 57 to longitudinally reciprocable shaft 66, while head 56 is carried by a bracket 59 clamped to another longitudinally reciprocable shaft 68. Head 58 is carried on a pair of shafts 70 which are connected to pistons (not shown) in hydraulic cylinders 72 in head 56. Shafts 66 and 68 carry cam-followers 74 and 76 which bear on cam 78 that is rotated once each grid cycle. The timing of cylinders 62 and shafts 66 and 68 are such as to produce four-motion travel indicated by the diagrams above the respective heads in Fig. 2, starting with the solid arrows. In that figure, heads 54 and 56 are shown as close to each other as they ever are during machine operation. The jaws of the several heads are closed on the grid strip by its respective hydraulic cylinder 62 under control of a cam 79 and reversible valve 81 connected to supply and return lines of a constant-pressure oil source. Reversal of pressure in any cylinder 62 separates its associated jaws.

Heads 54 and 56 are the first and second feeders in a continuous feeding mechanism. The strokes of the heads to the right and left in Fig. 2 do not alternate discontinuously but overlap, to insure smooth continuity of feeding.

The rate of feed is optionally varied during the winding of staked turns for variable-mu grids (Fig. 17) or is held constant for uniform-pitch grids (Fig. 16); but in any event there is a fast feed-stroke during the winding of the loose turns that are to be removed. The uniform head strokes normally produced by cam 78 (Fig. 2) are modified during each grid cycle, as necessary, by cam 83 acting on shaft 85 to shift cam 78 axially.

During the time that the jaws of head 56 are closed to grip the grid strip, the jaws of head 58 are also closed. When pressure is admitted to cylinders 72 by a suitable cam-controlled valve, head 58 travels to the right a greater distance than head 56. This causes stretching of the grid side rods that is required for mechanically working and straightening them.

Head 60 contains cutting blades to divide the individual grids from the grid strip being formed and to cut away deformed portions of the side rods, finally producing a grid as shown enlarged in Fig. 16 or 17. The hydraulic piston of head 60 operates generally in synchronism with the jaws of first feed head 54, and are open while the jaws of stretching head 58 are closed. The various specific features of the several four-motion heads and their operating mechanisms are described in further detail and claimed in the above-mentioned co-pending application of which I am a joint inventor.

Notching tools

The supporting, operating and controlling mechanism for notching tools 44 may be best understood by reference to Figs. 3 through 6. Sharp-edged notching discs 44 are carried by adapters 80 which support them in planes at slight opposite angles to the vertical. In this way the grid lateral wire on opposite sides of the mandrel may be laid in naturally slanted notches to form a good helix.

Discs 44 are not fixed to support 80 but are frictionally held against rotation. For certain reasons, not now apparent, discs 44 tend to rotate slowly, thereby presenting progressively changing edges to the grid side rods. The sharpness and accuracy of each disc 44 are thus preserved over long intervals of operation.

During the times when side rods are to be notched, as distinguished from the times when loose turns are being wound, each disc 44 is reciprocated at a high rate. For this purpose each disc 44 is mounted on a horizontal slide 82 which is snugly confined in channelled support 84. Looseness of the slide that would cause inaccuracy of disc 44 is prevented by a spring pressed pad within block 86 secured to channel 84 and by spring-pressed pad 88 (Fig. 6).

Slide 82 is reciprocated by an eccentric 90 on shaft 92 which is supported in ball bearings and rotated by spur gear 94. The bearings of shaft 92 are carried in housing 96 to which channel 84 is secured. Eccentric 90 travels in a circular path, naturally, whereas slide 82 reciprocates horizontally. Consequently, a vertical slot 97 is provided in slide 82, bounded by wear-resistant inserts.

Rotation of gear 94 reciprocates slide 82 longitudinally and causes high-speed notching of the opposed side rod. During the intervals when not notching is to be effected, when loose turns are being wound, the reciprocation of the notching tool is not interrupted; the entire reciprocating assembly is retracted. In this manner the drive and timing of the high-speed motion is maintained during idle intervals, and the notching tools are removed from the path of grid-lateral guide 42 as it encircles mandrel 30. For this purpose, pinion housing 96 is suspended for uniform travel by a parallel pair of leaf springs 98, depending from bracket 100. A form of very quiet toggle, comprising a pair of grooved members 102 and 104 with an interponent 106 between them, is effective to permit retraction of housing 96 whenever member 104 is lowered. When this occurs, a strong coil spring 108, held in tension between pin 110 on housing 96 and a pin on bracket 100, retracts disc 44 and interrupts the notching. Grooved member 104 is carried by a cam-follower 112 which rests on cam 114.

Referring to Fig. 5, cam follower 112 is shown constrained for accurate, substantially linear travel by a pair of leaf springs 116 and is urged against cam 114 by tensioned coil spring 118. Leaf springs 116 are anchored in a bracket 120 secured to the machine bed. When cam follower 112 reaches a low spot in cam 114, spring 118 lowers grooved member 104, and the resultant angularity of interponent 106 allows spring 108 to retract the entire reciprocating assembly supporting disc 44.

Reaction of tool 44 is transmitted from housing 96 through interponent 106 and grooved member 104 to an adjustable stop 122 on bed plate 24 (Figs. 3 and 4). Stop 122 is provided with an indicator 126 and a scale 128 so that the depth of notch made by tool 44 can be corrected directly when the necessary change has been ascertained with the aid of a microscope by the operator in examining the notches theretofore made by disc 44. The surface 130, on cam follower 112, which engages stop 122 is sufficiently wide so that it remains in contact with stop 128 even when the low spot on cam 114 is encountered.

The arrangement of the control mechanism for moving the notching disc into operative condition provides a very accurate and direct control over the depth of penetration. This is independent of wear of the control cam since interponent 106 will always be essentially horizontal when raised, irrespective of slight inaccuracies in cam 114. A more uniform and thus superior product is made possible. The retraction of the support of tool 44 does not disturb the reciprocating drive. Pinion 94 is driven by larger pinion 132 which is rotatable in a fixed bearing on the machine bed 24. Since the reciprocation of housing 96 is substantially along the top surface of relatively large driving gear 132, the timing and drive of pinion 94 are maintained.

For some purposes, as in the manufacture of variable-pitch grids using a preformed pitch-control cam 83, it is important that each tool 44 should form a notch exactly at a desired point along its related side rod R. Discs 44 should be adjustable along the mandrel with relation to the other. For this purpose the support 100 for the housing suspension springs 98 is adjustable longitudinally of the mandrel by virtue of a slide construction. The rearward slide portion of support 100 is normally clamped against bracket 134 by overhanging plates 136. These plates are loosened during adjustment which is effected by screw 138 having a bearing in fixed bracket 134. In order that the degree of adjustment may not be left to guess, a micrometer gauge 140 is secured to support 100 and the change in adjustment is indicated when the micrometer reacts against adjustable but stationary screw 142.

In order that suspension leaf springs 98 may remain substantially vertical and, therefore, the travel of pinion housing 96 may be substantially horizontal and rectilinear, bracket 134 is made laterally adjustable with respect to the machine bed, and it is fixed in any adjusted position by bolts 144.

Peening tools

The peening discs are reciprocated at high speed by a pinion and an eccentric in exactly the same manner as the notching discs (see Fig. 9) and a driving gear 132 for each of the notching discs is secured to the same shaft 143 that rotates driving gear 146 for each of the peening-tool pinions (not shown). The other pair of notching and peening tools are similarly driven by a pair of gears on a common drive shaft. A driven helical gear 145 is also secured to each shaft, and meshed helical gears 147 (Fig. 4) at opposite ends of a drive shaft thereby maintain the predetermined alternation of the notching discs with each other and with their associated peening tools. Cam 114a and cam-follower 112a retract the high-speed reciprocating assembly for interrupting the peening operations during winding of loose turns, just as for the notching discs under control of cams 114 and cam-followers 112.

At times it becomes necessary to vary the position of the peening tools 46 longitudinally relative to mandrel 30 so that the distance from the notching discs may be altered. This is to be effected cyclically where the pitch of the peened grid laterals is to vary, as for grids of the type in Fig. 17. For this purpose the support 148 (Figs. 1 and 10) which carries the peening reciprocating assembly 149 on parallel leaf springs 151 (only one being shown) is carried by a further parallel pair of leaf springs 150 for adjustment along the mandrel. Because leaf springs 151 are arranged with their wide faces parallel to this adjustment, the longitudinal changes in position of the reciprocable assembly are positive. In Fig. 1 support 148 is carried by springs 150 for limited movement horizontally along a practically straight line. A compression spring 152 is confined between support 148 and fixed bracket 154. This urges the peening tools toward the notching tools. Acting in opposition to this is a series of levers and a cam which determine the precise position of the peening tool with respect to the notching tool. Acting on offset portion 155 of support 148 is a lever 156 secured to shaft 158 which in turn carries another lever 160. The latter acts on a slide 162 for transmitting the reaction from compression spring 152 to lever 164 (see also Fig. 2) through an adjustable thumbscrew 166. Lever 164 is fixed to shaft 168 below the machine bedplate and is operated by cam-follower 170 bearing on cam 172.

During a variable-pitch grid winding cycle, cam 172 adjusts the position of both supports 148 of the peening tools so that the grid laterals, laid in notches made by notching discs 44 will be properly peened. It should be understood, of course, that the peening tools might in the alternative have been located definitely along mandrel 30 and the notching discs made adjustable under control of a cam as described above. It will also be apparent that the machine can be set up for even-pitch grid-making, by locking shaft 158 in place and removing cam 172; and where the flexibility of the machine is not to extend to precision manufacture of variable-pitch grids, the supports 148 for the peening heads should be adjustably locked in place as in the case of the notching discs.

Variable pitch winding head control

It is apparent from the foregoing discussion of the cyclic adjustment of peening disc 46 along mandrel 30 that this is a requirement for the precise manufacture of variable pitch grids. For the same reason it is necessary to adjust the position of grid-lateral guide 42 along mandrel 30. Between the time that a notching disc 44 leaves a side rod R and the time that the grid-lateral L is laid by winding guide 42 into the notch just made, one quarter of a winding cycle elapses. During that time the side rods R are drawn along mandrel 30 approximately one quarter of a pitch. If that pitch is to be varied and the winding guide 42 is to lay the grid lateral L accurately into the previously formed notch, the necessity for adjustment of guide 42 along mandrel 30 will be understood. In order to effect this adjustment the entire winding head 32 housing 36 and gear 34 are mounted for limited adjustment along tube 26 which supports mandrel 30, gear 34 remaining in mesh with its fixed drive gear 34a. In Fig. 1 compression spring 173, confined between fixed post 175 and guide rod 177 in stationary bearings 179, urges housing 36 and all its assembly toward the support 28 of side-rod guide 26. A lever 181 attached to shaft 168 that is controlled by cam 172 cyclically adjusts the position of the winding head and the lateral guide finger 42 as a unit, against compression spring 173. A screw 183 in block 185 that is slidable along arm 181 adjusts the position of housing 36 and the effective length of arm 181, respectively. Where cyclic adjustment is not required it is, of course, evident that this cyclic adjustment mechanism may all be replaced by an adjustable stop on bed plate 24.

Loose turn removal

As stated above, the loose turns are to be parted from the peened turns, following each winding sequence, by blades 48 and 50. The mechanism for operating these blades is shown in Figs. 7, 8 and 9. These blades are longitudinally and laterally adjustable, with respect to mandrel 30, so that a single pair of blades can be used irrespective of the design of grid to be wound. These blades are supported in a pair of laterally reciprocable slides 174 which are normally urged toward retracted position by compression springs 176 (only one of which is shown in Fig. 7). For the purpose of operating blades 48 and 50 at precisely the correct time the following mechanism is preferred, although it will be readily apparent that wide latitude of substitution may be exercised in this respect.

A pair of oscillatory levers 178, one for each slide 174, are carried by a T-shaped vertically reciprocable slide 180. This slide is normally urged into elevated position by compression spring 186 and is retracted by cam-following lever 182 on cam 184. Spring 186 maintains cam follower 182 in contact with cam 184 by downward thrust against cupped washer 187 on fixed frame 189 carried by bed plate 24, and by upward thrust against cupped washer 191 that is pinned to slide 180. When the blades are idle, slide 180 is lowered and actuators 178 are too low to affect the depending portions 193 of slides 174. These actuators 178, however, are oscillated at a high rate by cranks 188 on eccentrics 190, rotated by pinions 192 in mesh with the drive pinions 146 of one of the peening-tools (see also Fig. 9). However, when the high part of cam 184 passes, and spring 186 is effective to raise actuators 178, the latter are effective in a quick oscillatory stroke to reciprocate blades 48 and 50 toward mandrel 30, to breach the ends of the loose-turn winding. The timing is such that actuators 178 are in their retracted positions during their elevation by spring 186, and the loose-turn rupture is effected by the drive from eccentrics 190.

The adjustments of blades 48 and 50 longitudinally of and laterally of the mandrel are self-evident from the drawings. Blades 48 and 50 are vertically adjustable to effect the results in Fig. 14 without disturbing the accurately timed and precise stroke of their operating mechanism described above. The assembly 194 for carrying slides 174 is supported by a pair of slides 196 reciprocable in frame 189. These slides 196 are connected by plate 198 and are urged downward by compression spring 200. For maintaining assembly 194 at the desired elevation there is a lever 202 having a short arm acting in notch 204 in slide 196 and a long arm depressed by a calibrated adjustment screw 206. When microscopic examination of the grids being made by the machine indicates that the loose-turn blades should be vertically adjusted a certain extent, this can be directly effected by calibrated screws 206, without trial-and-error procedure.

*Loose turn picker*

Blades 48 and 50 are effective merely to part the loose-turn winding from the peened grid lateral. A mechanical picker is provided for removing this loose wire while the strip of grid material is still on the mandrel. The details of picker 52 shown generally in Figs. 2 and 13, are more completely illustrated in Figs. 11, 11A and 12. There are two motions to be accomplished by the picker, namely, reciprocation of a pair of jaws to and from mandrel 30, and the opening and closing of those jaws at the proper times. Referring to Fig. 11A the picker is reciprocating by a hydraulic system including a piston 210 on shaft 212 which moves longitudinally in cylinder 214. By means of two-way valve 216, oil from a constant-pressure line 218 can be supplied to either line 220 or 222 while the remaining line 220 or 222 is connected to a return low-pressure line 224. A constant-pressure pump and release valve 226 draws its supply from sump 228 through line 230 and the excess pressure-relief oil is returned to sump 228 through line 232. Valve 260 is operated by one of the cams 79 in Fig. 2.

Referring to Fig. 11 it will be seen that shaft 212, supporting piston 210 within cylinder 214, is of tubular construction and contains a rod 234. Cylinder 214 is supported on a fixed bracket 236 carried by the machine bed plate and adjustably carries a pair of stops 238 and 240. At the top end of rod 234 there is secured an arm 242 which is slotted to receive another rod 244, laterally secured to the upper bulkhead of cylinder 214 for holding rod 234 against rotation and for limiting its axial stroke. The axial stroke of tubular shaft 212 is limited by the length of the hydraulic cylinder and the length of the piston. Stops 238 and 240 are set to arrest rod 234 prior to the upper and lower excursion of shaft 212, for opening and closing the mechanical jaws at the lower part of Fig. 11. One of the jaws 246 is formed integrally with rod 234 and is called "fixed." The other jaw 248 moves in a slot in rod 234 and is pivoted at 250. Both of the jaws are provided with small hardened wear resistant gripping surfaces.

In the position shown in Fig. 11 the jaws are closed, and are held in this configuration by a radial slide 252 carried by collar 254 and urged radially inward by coil spring 256 which surrounds collar 254.

Tubular shaft 212 and the closed picker remain in the lowered position shown for only a brief period after the loose turns have been parted from the remainder of the secured grid-lateral wire. Piston 210 commences its upward excursion, with jaws 246 and 248 closed as shown; and they remain closed until the upper end of rod 234 contacts stop 238. At this time tubular shaft 212 carries collar 254 and radial slide 252 above and beyond pivot 250 of movable jaw 248. By the time piston 210 reaches its upper extreme, jaws 246 and 248 are open and the loose turn which was picked up at mandrel 30 is released for removal by an air blast or otherwise suitably collected. When the picker is again returned toward the mandrel for engaging another loose-turn winding, collar 254 remains above pivot 250 until arm 242 engages stop 240; and until that time the jaws remain open. The continued descent of shaft 212 carries collar 254 below pivot 250 and at its lowest extreme jaw 248 closes against jaw 246 to grip the next freed loose-turn winding. It will be observed that mandrel 30 is flattened in the loose-turn zone so that the jaws have clearance to grip the wire that previously was formed about the generally elliptical portion of the mandrel in the zone of the notching and peening discs.

*Automatic machine control*

Contributing to the automatic characteristic of the grid-making machine is a machine stop and indicator which is activated under control of the grid-lateral supply and, optionally, of the side-rod supply, so that when either of these is breached or becomes exhausted the machine will stop. This feature is desirable to avoid waste, and in an automatic grid machine because the product is assembled in groups of a definite number of grids and the machine should stop and provide indication when grid-making is interrupted. The structural detail of this system is shown in Figs. 1, 18, 19 and 20. From Figs. 18 and 19 it will be apparent that winding head 32 is electrically and mechanically spaced from guide 26 for side rod R. Reel 40 is supported on plate 260 by stud 262 for frictionally retarded rotation. Plate 260 is screwed to metal block 264 but is electrically insulated therefrom by insulating sleeve 266 and sheets 268 and 270 of insulating material. A counterweight 272 provides dynamic balance for reel 40, the assembled weight of which is practically constant irrespective of the amount of wire on that reel. Guide 42 for the grid-lateral wire is similarly secured to block 264 by screws, insulating sleeves 274 and sheets of insulation 276 and 278.

Block 264 is formed integrally with a tubular portion 280 that is rotatably supported in ball bearings in housing 36. Fibre gear 34 is locked between the inner ball bearing races, keyed to portion 280, and held in assembly with block 264 by castellated lock nut 282. An insulated wire 284 provides electrical connection between the reel 40 of grid-lateral wire and a conductive ring 286 that is set into fibre gear 34. An electrical brush 288 provides for stationary contact to the rotary winding head. An electrical circuit is normally maintained from brush 288, through the grid-lateral wire itself to the machine base in a machine-control circuit, and is made necessary for continued machine operation.

Figure 20:
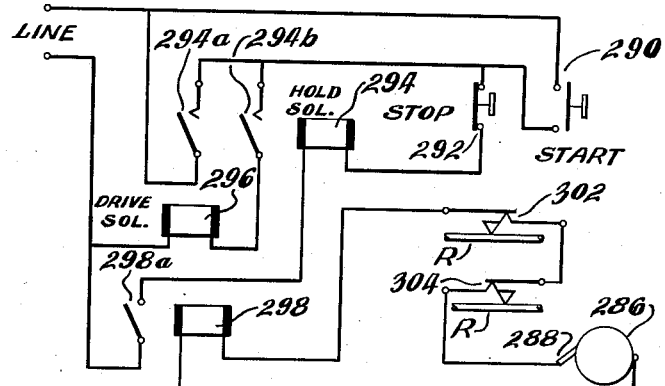
Fig. 20 is the wiring diagram of a wire-failure detection circuit.
Figure 19:
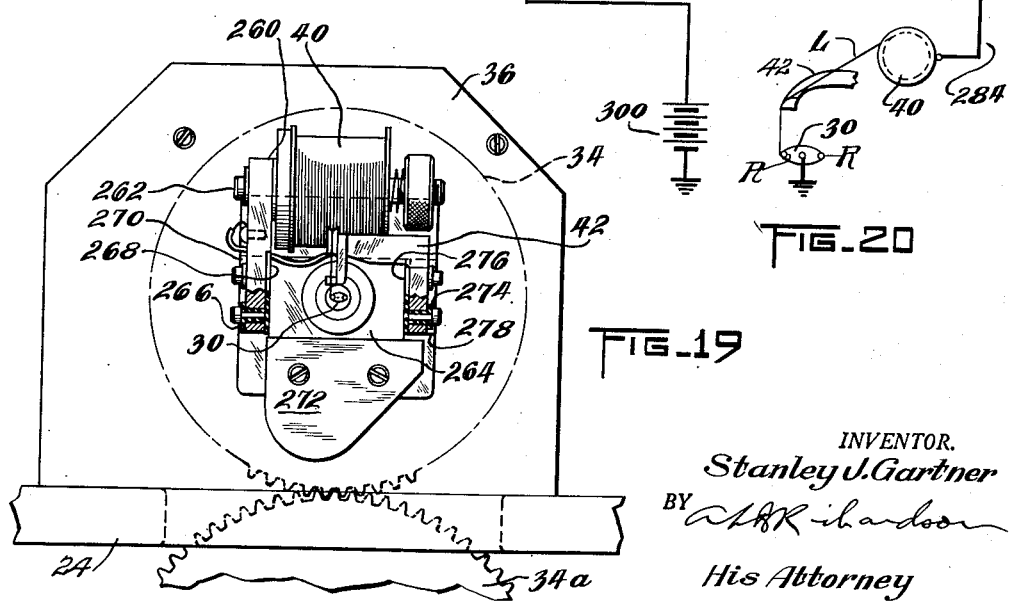
Fig. 19 is an end view thereof.

The machine-control circuit is shown in Fig. 20. "start" switch 290 and "stop" switch 292, together with hold solenoid 294 and its contacts 294a and 294b sustain the energization of drive-control solenoid 296. Provided that indicator and stop solenoid 298 is energized, as it will be when grid lateral L and the side rods R are properly in position, the machine can be started by closing contacts 290 for energizing hold solenoid 294 through contacts 298a. Closure of contact 290 is thereby effective to close contacts 294a in parallel with contact 290 forming a holding circuit and to close contacts 294b for energizing drive solenoid 296. Hold solenoid 294 will become de-energized when stop contacts 292 are opened or when contacts 298a are opened as will be the case when the grid lateral L or side rods R become discontinuous.

The circuit for indicating and drive-stopping solenoid 298 is energized by a power supply 300 and extends through a pair of delicate switches 302, 304, one bearing on each side rod R, and, through electrical brush 288, slip ring 286, conductor 284, reel 40, and grid lateral L, to the mandrel 30 which is returned to power supply 300.

It is evident that failure of supply of either side rod R or of grid lateral L will interrupt the series circuit to supply 300 thereby de-energizing solenoid 298. When this occurs contacts 298a interrupt the line circuits through holding solenoid 294, and contacts 294b for energizing drive solenoid 296 are opened. When this occurs a suitable lamp or mechanical indicator will also usually be energized to signal for an operator.

Numerous modifications of the apparatus of the present invention will occur to those skilled in the art, and accordingly the appended claims should be given a latitude of interpretation consistent with the disclosure and at times certain features of the invention will be used without a corresponding use of other features.

What I claim is:

1. In a grid forming machine, the combination of a mandrel having a fixed axis for supporting a grid side-rod, a tool for laterally penetrating the side-rod accurately to a desired extent, an abutment substantially in line with said tool and said mandrel, and means acting between said tool and said abutment for alternatively extending and retracting said tool with respect to said mandrel said last-named means including a cam, a cam follower movable substantially perpendicularly with respect to the line of said tool, said mandrel and said abutment, and a parallel pair of leaf springs for carrying said cam follower.

2. In a grid-forming machine, the combination of a mandrel for supporting a side-rod; a tool assembly comprising a tool for laterally penetrating the rod accurately to a desired extent, a carrier for said tool, and drive means supported by said carrier for rapidly reciprocating said tool against said rod; and mechanism for shifting said tool assembly into and out of operative relationship with respect to the rod, said carrier being supported for shifting movement by a pair of parallel leaf springs.

3. In a grid-making machine, a mandrel for supporting a side rod, a tool periodically reciprocated toward said mandrel for penetrating the rod, a winding head having a guide projection periodically passing between said mandrel and said tool, mechanism for reciprocating said tool through a definite stroke to contact the rod and remove it from the path of said guide, and means for shifting said tool and its reciprocating mechanism as a unit away from said rod to prevent contact of said tool with the side rod without interrupting the cyclic removal of said tool from the path of said guide.

4. A grid-forming machine comprising a rigid support for a grid side-rod, feeding means for moving the rod lengthwise at cyclically varying speeds to control the winding pitch, a notching tool operable at regular intervals for incising the side-rod, a winding head for laying a grid lateral into the notched side-rod and a peening tool for staking the wound lateral in place, said notching tool and peening tool being mutually adjustable along the side-rod, and cam-controlled mechanism for adjusting the mutual spacing of said tools in accordance with the variable feeding speed.

5. Apparatus according to claim 4 wherein said winding head is adjustable relative to said tools along the side-rod, and cam-controlled mechanism for adjusting said winding head in relation to said tools in accordance with the variable feeding speed.

6. In a grid-winding machine having a winding mandrel for supporting at least one grid side-rod for longitudinal travel, a winding head for laying a helical grid-lateral about said mandrel, means for securing the grid-lateral to the side-rod, a device for cyclically disabling said securing means after completing the winding of each grid to provide unsecured laterals between grids, and a parting tool for mechanically separating the unsecured laterals from the secured winding cyclically forced against the side rod in the region of its support by said mandrel.

7. Apparatus according to claim 6 including cyclically operable means for removing the separated unsecured laterals from the side-rod.

8. In a grid-making machine having automatic means for helically winding a grid lateral about a mandrel supporting a longitudinally advancing side rod and for securing a series of turns of the winding to the side rod leaving loose turns, a loose turn remover comprising a blade cyclically reciprocated against the grid lateral wire to breach it by mechanical coaction between said blade, the side rod and said mandrel.

9. In a grid winding machine having a winding mandrel for supporting at least one side rod for longitudinal travel, a winding head for laying a helical grid lateral about said mandrel, means for securing said grid lateral to the side rod, a device for cyclically disabling said securing means after completing the winding of each grid to provide unsecured laterals between grids, and a parting tool cyclically forced against the side rod in the region of its support by said mandrel to sever the unsecured lateral from the remainder of the grid lateral, said tool being so adjusted as to imbed the cut end of said secured grid lateral in the material of said side rod.

10. In a grid making machine having automatic means for helically winding a grid lateral about a mandrel supporting a longitudinally advancing side rod and for securing a series of turns of the winding to the side rod leaving loose turns, a loose turn remover comprising a blade cyclically reciprocated against the grid lateral wire to breach it by mechanical coaction between said blade, the side rod and said mandrel, said blade acting to imbed the breached end of said secured grid lateral wire in the material of said side rod.

11. In a grid winding machine having a winding mandrel for supporting at least one side rod for longitudinal travel, a winding head for laying a helical grid lateral about said mandrel, means for securing said grid lateral to said side rod and a device for cyclically disabling said securing means after completing the winding of each grid to provide unsecured laterals between grids, a parting tool, means for cyclically forcing said tool against the side rod in the region of its support by said mandrel to sever the unsecured lateral from the remainder of the grid lateral, said parting tool being arranged to so engage said side rod as to imbed the cut end of said secured grid lateral in the material of said side rod.

12. In a grid winding machine having a winding mandrel for supporting at least one side rod for longitudinal travel, a winding head for laying a helical grid lateral about said mandrel, a parting tool, means for cyclically forcing said tool against said side rod in the region of its support by said mandrel to sever said grid lateral at selected points along said side rod, said parting tool being arranged to so engage said side rod as to imbed one cut end of said grid lateral in the material of said side rod.

13. In a grid winding machine having a winding mandrel for supporting at least one side rod for longitudinal travel, a winding head for laying a helical grid lateral about said mandrel, means for securing said grid lateral to said side rod, a parting tool, means for cyclically forcing said tool against the side rod in the region of its support by said mandrel to sever said grid lateral at selected points along said side rod, said parting tool engaging said side rod eccentrically so that one cut end of said grid lateral is imbedded in the material of said side rod.

14. In a grid machine, the combination of a mandrel for supporting a rod, means for moving said rod along said mandrel, a tool assembly comprising a tool for laterally penetrating the rod accurately to a desired extent, a carrier for said tool, and drive means supported by said carrier for rapidly reciprocating said tool against said rod, and mechanism for cyclically shifting said carrier to engage said tool assembly in operative relationship with respect to said rod.

15. In a grid winding machine having a winding mandrel for supporting at least one side rod for longitudinal travel, means for moving said side rod along said mandrel, a winding head for laying a helical grid lateral about said mandrel, a parting tool, means for cyclically forcing said tool against said side rod in the region of its support by said mandrel to sever said grid lateral at selected points along said side rod, said parting tool being arranged to so engage said side rod as to imbed one cut end of said grid lateral in the material of said side rod.

16. In a grid winding machine having a winding mandrel for supporting at least one side rod for longitudinal travel, means for causing said rod to travel, a winding head for laying a helical grid lateral about said mandrel, means for securing said grid lateral to said side rod, a parting tool, means for cyclically forcing said tool against the side rod in the region of its support by said mandrel to sever said grid lateral at selected points along said side rod, said partiing tool engaging said side rod eccentrically to imbed said lateral in said side rod and to sever said lateral to one side of said parting tool.

17. A machine for winding a helical lateral wire about a side rod member and securing it thereto; means for cutting said lateral wire at selected points along said side rod including a parting tool directed to cut said lateral wire between said mandrel and said tool, said tool engaging said side rod ecentrically to imbed one cut end of said lateral wire in the material of said side rod.

18. A grid machine comprising a stationary mandrel for winding and supporting a grid side rod, feed means for moving said side rod lengthwise, a notching tool for laterally incising said side rod, a winding head for laying a grid lateral into the incisions, and a peening tool for forming the side rod material over the grid lateral in the incision, said notching and peening tools being arranged one adjacent the other and reciprocable toward and away from said side rod in alternation, and slide supports for directing said tools at a small acute angle with respect to each other whereby said tools engage said side rod at substantially juxtapositioned points.

19. A grid machine comprising a side rod support, a feed mechanism for drawing a side rod relatively along said support, a notching tool and a peening tool for engaging said side rod as it moves along said support, supporting mechanisms for carrying said tools closely adjacent one another and actuating mechanisms moving said tools in alternation along convergent paths making a small acute angle with respect to each other.

20. A helical grid making machine comprising a side rod support, a feed mechanism for drawing a side rod relatively along the support, a notching tool for engaging the side rod as it moves along said support, and supporting and actuating mechanisms for carrying said tool toward said side rod support in alternation at a small acute angle with respect to a plane normal to the direction of travel of said side rod such that the notches formed by said notching tool lie along the line of a helix.

21. In a grid forming machine, the combination of a mandrel for supporting a side rod, a tool assembly comprising a tool for laterally penetrating said side rod accurately to a desired extent, a carrier for said tool, a laterally shiftable housing carrying an eccentric drive means in engagement with said carrier, means for continuously rotating said drive means whereby said carrier and housing are reciprocated one relative to the other, a fixed abutment, a member slidable transversely to the line of reciprocation of said tool and interposed between said abutment and said housing, said slidable member and said housing each carrying a transverse slot on adjacent faces and an interponent member in said slots, said interponent member being effective to hold said housing against reciprocation in one position of said slidable member whereby said carrier is reciprocated and being ineffective to hold said housing in another position of said slidable member whereby said tool does not contact said side rod.

22. A machine including a support for a work piece, a tool for penetrating said work piece to a predetermined extent, a fixed abutment for withstanding the reaction of said tool as it penetrates said work piece, said tool lying along a line between said support and said abutment, a carrier for said tool having mechanism for continuously reciprocating said tool, a slidable member interposed between said carrier and said abutment and movable along a line transverse to said line between said support and said abutment, a pair of aligned notches one in said slidable member and the other in said carrier and lying transverse to the direction of motion of said slidable member and an interponent member in said notches, said interponent member in one position of said slidable member being effective to block said carrier to cause said tool to penetrate said work piece and in another position of said slidable member being ineffective to block said carrier whereby said tool reciprocates idly.

23. In a grid forming machine, the combination of a mandrel for supporting a side rod, a tool assembly comprising a tool for laterally penetrating said side rod accurately to a desired extent, a carrier for said tool, a laterally shiftable housing carrying an eccentric drive means in engagement with said carrier, means for continuously rotating said drive means whereby said carrier and housing are reciprocated one relative to the other, a fixed abutment, a member slidable transversely to the line of reciprocation of said tool and interposed between said abutment and said housing, said slidable member and said housing each carrying a transverse slot on adjacent faces and an interponent member in said slots, said interponent member being effective to hold said housing against reciprocation in one position of said slidable member whereby said carrier is reciprocated and being ineffective to hold said housing in another position of said slidable member whereby said tool does not contact said side rod, and a cam follower carrying said slidable member and a cam moving said follower to cause said interponent to alternately block and release said carrier.

24. A machine including a support for a work piece, a tool for penetrating said work piece to a predetermined extent, a fixed abutment for withstanding the reaction of said tool as it penetrates said work piece, said tool lying along a line between said support and said abutment, a carrier for said tool having mechanism for continuously reciprocating said tool, a slidable member interposed between said carrier and said abutment and movable along a line transverse to said line between said support and said abutment, a pair of aligned notches one in said slidable member and the other in said carrier and lying transverse to the direction of motion of said slidable member and an interponent member in said notches, said interponent member in one position of said slidable member being effective to block said carrier to cause said tool to penetrate said work piece and in another position of said slidable member being ineffective to block said carrier whereby said tool reciprocates idly, and a cam follower carrying said slidable member and a cam moving said follower to cause said interponent to alternately block and release said carrier.

25. A grid-forming machine comprising a mandrel for guiding and supporting a grid side rod, feed means for moving said side rod lengthwise of said mandrel, a notching tool for laterally incising said side rod, a winding head for laying a grid lateral in the notch formed in said side rod, a peening tool for swaging material of said side rod over the grid lateral in said notch, slide means mounting said notching and peening tools adjacent one another for movement along lines of action at a small acute angle with respect to each other whereby said tools engage said mandrel at substantially juxtaposed points, and means operatively connected to said tools for reciprocating said tools toward and away from said mandrel in alternation.

26. A helical grid-making machine comprising a support for a grid side rod, a feed mechanism for moving said side rod along said support, a notching tool and a peening tool arranged in adjacent relation for engaging said side rod during movement along said support, support and actuating mechanisms for alternately moving said tools into contacting relation relative to said side rod on said support along convergent paths, and means for periodically shifting the assembly of said tools and said support and actuating mechanisms away from said support to prevent contact of said tools with said side rod without interrupting movement of tools under control of said actuating mechanisms.

27. A grid machine comprising a side rod support, a feed mechanism for drawing a side rod relatively along said support, a notching tool for engaging said side rod as it moves along said support, a winding head for laying a grid lateral into the notched side rod, a peening tool engaging said side rod in timed relation to notching of said side rod and laying of said grid lateral for staking the wound lateral in place, supporting mechanisms for carrying said notching and peening tools closely adjacent one another, and actuating mechanisms moving said tools in alternation along convergent paths making a small acute angle with respect to each other.

References Cited in the file of this patent

UNITED STATES PATENTS

| Number | Name | Date |
|---|---|---|
| 1,795,303 | Gray | Feb. 10, 1931 |
| 1,897,460 | Anderson | Feb. 14, 1933 |
| 1,903,234 | Gray | Mar. 28, 1933 |
| 1,947,449 | Anderson | Feb. 20, 1934 |
| 1,978,108 | Howald | Oct. 23, 1934 |
| 1,994,307 | Flaws | Mar. 12, 1935 |
| 2,064,169 | Kershaw | Dec. 15, 1936 |
| 2,068,628 | Kronenwetter | Jan. 19, 1937 |
| 2,181,288 | Washburn | Nov. 28, 1939 |
| 2,242,782 | Gray | May 20, 1941 |
| 2,272,751 | Robinson | Feb. 10, 1942 |
| 2,380,320 | La France | July 10, 1945 |
| 2,426,522 | Porter | Aug. 26, 1947 |
| 2,441,228 | Schneider | May 11, 1948 |
| 2,480,677 | Sheffield | Aug. 30, 1949 |